United States Patent [15] 3,669,962
Smith et al. [45] June 13, 1972

[54] PROCESS FOR THE PREPARATION OF HYDROXYBENZYL-SUBSTITUTED ISOCYANURATES

[72] Inventors: Peter D. Smith, Cleveland; George Kletecka, Fairview Park, both of Ohio

[73] Assignee: The B. F. Goodrich Company, New York, N.Y.

[22] Filed: May 27, 1969

[21] Appl. No.: 828,377

[52] U.S. Cl. ............................260/248 NS, 260/94.9 GC
[51] Int. Cl. .....................................................C07d 55/38
[58] Field of Search ................260/248 NS, 249.6, 248 AS

[56] References Cited

UNITED STATES PATENTS 3,531,483   9/1970   Gilles....................................260/248

2,454,078   11/1948   McGrew............................260/249.6

OTHER PUBLICATIONS

" Cyanuric Acid," F.M.C. Corporation Product Bulletin 10B, April 1965, New York, pages 1– 7 and 13– 22.

*Primary Examiner*—John M. Ford
*Attorney*—J. Hughes Powell, Jr. and Ernest K. Bean

[57] ABSTRACT

Hydroxybenzyl-substituted isocyanurates are prepared by the reaction of a phenol with cyanuric acid or a partial ester of cyanuric acid and formaldehyde in an alcoholic reaction medium. The hydroxybenzyl-substituted isocyanurates and particularly 3,5-dialkyl-4-hydroxybenzyl isocyanurates are useful stabilizers for a wide variety of organic materials including olefin homopolymers and copolymers.

17 Claims, No Drawings

PROCESS FOR THE PREPARATION OF HYDROXYBENZYL-SUBSTITUTED ISOCYANURATES

BACKGROUND OF THE INVENTION

Esters of cyanuric acid wherein the ester substituent is an aliphatic hydrocarbon radical are known. These alkyl-substituted isocyanurates have been prepared by reacting an alkyl halide and potassium cyanate and other such trimerizations of cyanates and isocyanates; reacting cyanuric acid with an alkyl halide or alkenyl halide in the presence of a basic acceptor; or the reaction of a metal salt of cyanuric acid with an alkyl sulfate or alkyl halide. Processes available for the preparation of aryl-substituted isocyanurates, especially where the aryl substituent contains a functional group such as a hydroxyl group, are even more limited. These processes typically result in poor yields of a low purity product due to the numerous side reactions which occur and they require long reaction times and the use of costly starting materials.

SUMMARY OF THE INVENTION

We have now discovered, quite unexpectedly, a process whereby hydroxybenzyl-substituted isocyanurates are obtained in good yield and high purity. The present invention provides a simple and economical process for preparing hydroxybenzyl-substituted isocyanurates by the condensation reaction of a phenol and cyanuric acid or partial ester of cyanuric acid with formaldehyde in an alcoholic reaction medium at an elevated temperature. The isocyanurate ring may be substituted with one, two or three hydroxybenzyl groups depending on the molar proportion of phenol employed and the number of reaction sites (>N—H) available on the ring. The phenols employed contain one or more alkyl radicals on the aromatic nucleus, and more preferably are 2,6-dialkyl phenols wherein the alkyl groups are tertiary alkyl groups. The process is generally conducted in the temperature range between about 70° C.

The hydroxybenzyl-substituted isocyanurates obtained by the present process are useful stabilizers for a wide variety of organic materials. They possess low volatility, are non-staining and are extremely effective protective agents for organic polymeric materials, both natural and synthetic, which are subject to the deleterious effects of oxygen, heat and both visible and ultraviolet light. They are especially useful as stabilizers for α-olefin homopolymers and copolymers, particularly, polyethylene, polypropylene, ethylene-propylene copolymers and ethylene-propylene terpolymers.

DETAILED DESCRIPTION

The present invention is directed to the preparation of hydroxybenzyl-substituted isocyanurates, and more particularly, to a process for the preparation of isocyanurates substituted with one or more hindered phenol groups. The process consists of the reaction of a phenol, cyanuric acid or a partial ester of cyanuric acid and formaldehyde in an alcoholic reaction medium and at an elevated temperature. It is particularly useful for the reaction of 2,6-dialkyl phenols, formaldehyde and cyanuric acid to obtain 3,5-dialkyl-4-hydroxybenzyl isocyanurates. When cyanuric acid is employed, the amount of the phenol can be varied so as to vary the degree of substitution on the isocyanurate ring. Reaction of a partial ester of cyanuric acid with phenol and formaldehyde in accordance with the present process will yield a mixed ester of cyanuric acid, that is, isocyanurates containing one or two other substituents besides the hydroxybenzyl group.

Cyanuric acid and partial esters of cyanuric acid corresponding to the structural formula

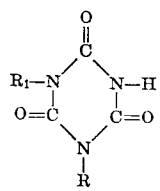

wherein R is a branched or straight chain aliphatic hydrocarbon radical containing from 1 to 20 carbon atoms and $R_1$ is hydrogen or a branched or straight chain aliphatic hydrocarbon radical containing from 1 to 20 carbon atoms, are employed for the present process. Especially useful partial esters for the present process are those containing one or two alkyl groups containing from 6 to 18 carbon atoms such as hexyl, 2-ethylhexyl, octyl, decyl, lauryl, palmityl and stearyl. For this process it is essential when a cyanuric acid ester (isocyanurate) is to be reacted that there be at least one >N-H grouping available on the ring to provide the necessary reaction site for the condensation with the phenol and formaldehyde. Although it is not essential that all three nitrogen atoms of the cyanuric acid ring have available hydrogen, excellent results have been obtained where cyanuric acid is employed to give the tris(4-hydroxybenzyl)isocyanurates. Other structurally related heterocyclic compounds, that is, those having a

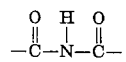

molecular grouping in the ring, may similarly be substituted with the hydroxybenzyl moiety in accordance with the present invention. Such compounds include: uric acid, hydantoin, allantoin, parabanic acid, alloxan, uracil, thymine, barbituric acid, phenobarbitone and the like.

Reacted with the cyanuric acid or partial ester of cyanuric acid is a phenol, or mixture of phenols, corresponding to the formula

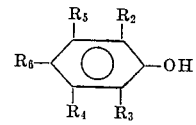

wherein $R_2$ is an alkyl group, either aliphatic or cycloaliphatic, containing from 1 to 18 carbon atoms and $R_3$, $R_4$, $R_5$ and $R_6$ are hydrogen or an alkyl group, either aliphatic or cycloaliphatic containing from 1 to 18 carbon atoms and at least one of the $R_3$, $R_4$, $R_5$ or $R_6$ groups is a hydrogen. More preferably the phenol is a 2,6-dialkyl phenol where $R_2$ and $R_3$ are alkyl groups containing from 1 to 12 carbon atoms and $R_6$ is hydrogen. Excellent results have been obtained when $R_2$ and $R_3$ are tertiary alkyl groups containing from 4 to 8 carbon atoms and $R_4$, $R_5$ and $R_6$ are hydrogen. Illustrative of the alkyl groups which may be substituted on the phenol ring are methyl, ethyl, n-propyl, isopropyl, butyl, hexyl, cyclohexyl, methylcyclohexyl, 2-ethylhexyl, octyl, lauryl, and the like. Exemplary of the tertiary alkyl groups are t-butyl, t-amyl, 1-methyl-1-ethylpropyl, 1,1-diethylbutyl, 1,1,2,2-tetramethylpropyl, 1,1-dimethylpentyl, 1,1,2-trimethylpentyl and the like.

In addition to the phenol and the cyanuric acid or partial ester thereof, formaldehyde is employed in the present process. Any reagent which will serve as a source of formaldehyde such as formalin solutions, paraformaldehyde and trioxane are suitable for the process and when the term formaldehyde appears subsequently in the specification and claims it is intended to include formalin, paraformaldehyde, trioxane and all other formaldehyde-liberating compounds. Excellent results have been obtained when the source of formaldehyde is paraformaldehyde, typically having up to about 100 or more formaldehyde units polymerized together. These materials are readily depolymerized under the reaction conditions employed and serve as a convenient and economical source of gaseous formaldehyde.

The reaction may be conducted with or without a catalyst. If a catalyst is employed, organic and inorganic basic materials such as primary, secondary and tertiary monoamines and polyamines, alkali metal alcoholates, alkali metal hydroxides, quaternary ammonium hydroxides and the like, will be used. The usual basic catalysts include diethylamine, tributylamine, ethylenediamine, tetramethylenediamine, hexamethylenetetramine, sodium ethoxide, potassium ethoxide, potassium t-butoxide, sodium hydroxide, potassium hydroxide, ammonium hydroxide, tetramethylammonium hydroxide, timethylbenzylammonium hydroxide, tricaprylylmethylammonium hydroxide and the like. Excellent results have been obtained when polyamines, preferably having a polycyclic structure such as hexamethylenetetramine, are employed. The amount of catalyst used can range up to about 0.1 mol per mol cyanuric acid or ester thereof and more preferably will be between about 0.0001 and 0.02 mol.

The process is conducted in an alcoholic reaction medium. Excellent yields of high purity product have been obtained when the reaction medium is an alcohol containing up to about 40 percent by weight water. Preferred as the reaction medium for the present process are alcohols containing about 5 to 25 percent by weight water. Alcohols which are employed contain up to about 6 carbon atoms with exceptional results being obtained with alcohols containing 4 carbon atoms or less such as methanol, ethanol, n-propanol, iso-propanol, n-butanol, sec-butanol, iso-butanol and tert-butanol. In general, those alcohols having high solubility parameters ($\delta$), that is, above about 11 as defined in Interchemical Review, 14, 3–16, 32–46 (1955), are useful in the present process. Mixtures of one or more alcohols of the above types, such as ethanol-methanol solutions, may also be employed if desired. The alcohol solutions may also contain minor amounts of other solvents such as ketones, ethers and hydrocarbons with no adverse influence on the reaction or purity of product.

It is usual to conduct the reaction at a temperature greater than about 70° C. When temperatures below about 50° C are employed the reaction rate drops off markedly and lower yields of the product are obtained. Temperatures up to about 180° C. may be employed, however, best results are obtained in the temperature range between about 90° C. and 150° C. The reaction will be conducted at atmospheric, sub-atmospheric or super-atmospheric pressures depending on the reaction temperature and the particular alcoholic reaction medium employed. With low-boiling alcohols closed reactors are used and operating pressures up to about 100 psig will typically be developed. The reaction can be conducted at pressures up to about 500 psig with no adverse results.

Although the process is readily carried out by combining the individual reactants in the manner and proportions described above, alternative techniques may also be employed to give similar results. For example, formaldehyde hydrate may be formed and reacted with the phenol and cyanuric acid or ester of cyanuric acid or the methylol derivative of cyanuric acid or partial ester of cyanuric acid can be pre-formed and subsequently reacted with the phenol to give the hydroxybenzyl-substituted isocyanurates. Such a process as the latter may be desirable and facilitate conducting the process on a continuous basis since the methylol derivative could first be formed and then in a subsequent stage be reacted with the phenol.

For the success of the present process all that is required is that the reactants be present within the defined molar quantities to achieve the desired degree of substitution and that the reaction be conducted in accordance with the above-described reaction conditions. The molar ratio of the reactants employed will vary depending on the number of available reaction sites (>N-H), that is, whether cyanuric acid or a partial ester of cyanuric acid is employed, and the degree of reaction desired. For example, if cyanuric acid is employed 3 mols of the phenol will be reacted per mol of the cyanuric acid for complete reaction to give the tris(hydroxybenzyl)isocyanurate. With a partial ester of cyanuric acid containing two reactive >N-H sites, such as hexylisocyanurate, 2 mols of the phenol will be reacted. If all the sites are to be reacted a molar excess of the phenol may be used to insure completeness of the reaction. The use of excess phenol will also compensate for impurities which may be present in the reaction system and also insure a rapid reaction rate. In general, no particular advantage is realized when more than about 20 percent excess of the phenol is present. Excellent results have been obtained when 5 percent molar excess of the phenol is employed. Where less than complete substitution of the cyanuric acid or partial ester of cyanuric acid is required, the molar amount of phenol employed will be decreased accordingly from the optimum level of one phenol group per >N-H group. For example, hexylisocyanurate is to be reacted and it is desired that only one hydroxybenzyl group be substituted thereon, one mol of the phenol is employed per mol hexylisocyanurate.

Just as with the phenol, the amount of formaldehyde required for the reaction is dependent on the number of available >N-H reaction sites and the degree of substitution desired. Equimolar amounts of the phenol and formaldehyde or a slight molar excess of formaldehyde, up to about 20 percent, based on the phenol will generally be used. With 5 to 10 percent molar excess of the formaldehyde based on the phenol, excellent yields of high purity hydroxybenzyl-substituted isocyanurates are obtained.

The following examples will illustrate the invention more fully, however, they are not intended as a limitation on the scope thereof. All parts and percentages in the examples are given on a weight basis unless otherwise indicated.

Various terms used throughout the Examples have been abbreviated for convenience. These are as follows:

2,6-DTBP = 2,6-Di-tertiary-butylphenol
CA = Cyanuric acid
HMTA = Hexamethylenetetraamine
3-A = Solution of 100 parts by volume ethanol and 5 parts by volume methanol
Fotocol = Solution of 100 parts 3-A, 10 parts by volume isopropanol and 1 part by volume methylisobutyl ketone

EXAMPLE I

To a reactor which was thoroughly purged with nitrogen was charged 247 grams 2,6-DTBP followed by the addition of 459 grams methanol and 81 grams water (15% water). Agitation was then commenced at about 75 rpm with a continuous nitrogen purge and 37.2 grams paraformaldehyde and 51.85 grams CA added to the reactor. After the addition of 1.65 grams HMTA catalyst the nitrogen purge was terminated and the reactor sealed. Agitation was then increased to about 180 rpm and the reactor and its contents heated to about 135° C. This temperature was maintained for about six hours. During the reaction the pressure within the reactor reached about 100 psig. The reactor was then cooled to room temperature and the reaction product transferred onto a filter. After repeated washings by reslurrying the product in methanol and refiltering, the material was dried and found to have a melt point in the range 212–223° C. 94.6 percent yield of a white crystalline solid identified as tris(3,5-di-t-butyl-4-hydroxybenzyl)isocyanurate was obtained. Infrared analysis of the product showed the absence of >N-H groups. Elemental analysis of the resulting product for carbon, hydrogen and nitrogen also confirmed the product as tris(3,5-di-t-butyl-4-hydroxybenzyl)isocyanurate.

Similar results were obtained when dodecyl isocyanurate was reacted with 2,6-DTBP and paraformaldehyde in aqueous methanol as described above. The molar amount of 2,6-DTBP was adjusted accordingly to compensate for the one less reactive group (>N-H) available in this instance so that 2 mols 2,6-DTBP per mol dodecyl isocyanurate was present. Bis(3,5-di-t-butyl-4-hydroxybenzyl)dodecyl isocyanurate melting at 84-86° C. was obtained in good yield.

EXAMPLE II

Employing the procedure described in Example I a series of runs were made employing 3-A as the solvent medium for the reaction. In all the runs the reaction medium consisted of 432 grams of 3-A and 108 grams water (20 percent water). The catalyst employed was HMTA. The amounts of reactants and catalyst, reaction conditions, and yield and melt point of the product are set forth below in Table I.

Additional runs made employing the same reactants and proportion of reactants with the 3–A reaction medium but employing different basic catalysts also gave tris-(3,5-di-t-butyl-4-hydroxybenzyl)isocyanurate.

Catalysts employed and found to be useful were tributylamine, trimethylammonium hydroxide, tricaprylylmethylammonium hydroxide, sodium hydroxide and potassium t-butoxide.

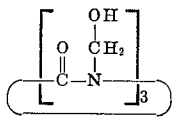

was recovered as a glossy solid, dissolved in the aqueous alcohol and reacted with the 2,6-DTBP (5% molar excess) in

TABLE I

| Run | 2,6-DTBP (grams) | Paraformaldehyde (grams) | CA (grams) | Catalyst (grams) | Reaction temp., ° C. | Reaction pressure (p.s.i.g.) | Percent yield | Melting point (° C.) |
| --- | --- | --- | --- | --- | --- | --- | --- | --- |
| 1 | 247 | 37.2 | 51.85 | 1.65 | 135 | 78 | 81 | 206–213 |
| 2 | 247 | 37.2 | 51.85 | 1.65 | 115 | 35 | 84 | 206–212 |
| 3 | 263.3 | 39 | 51.85 | 1.65 | 115 | 35 | 95 | 213–217 |

EXAMPLE III

Employing 500 grams of anhydrous 3–A and a reactant and catalyst charge identical to Run No. 1 of Example II, tris(3,5-di-t-butyl-4-hydroxybenzyl)isocyanurate was prepared. The reaction was conducted over a temperature range between 116° C. and 145° C. Maximum reaction pressure developed was 110 psig. The melt point and infrared analysis confirmed the product as tris(3,5-di-t-butyl-4-hydroxybenzyl)isocyanurate.

EXAMPLE IV

Tris(3,5-di-t-butyl-4-hydroxybenzyl)isocyanurate was prepared using aqueous isopropanol and n-propanol solutions as the reaction medium. The charging techniques were identical to that described in Example I. The amounts of reactants, reaction conditions, yields and melt point of the products are tabulated in Table II.

Similar results are obtained when other phenols such as o-cresol, 2-methyl-6-t-butylphenol, 2,6-diisopropyl-phenol, 2-t-butyl-5-methylphenol and 2-t-butyl-4-methylphenol are substituted in an equivalent molar amount for the 2,6-DTBP in the above runs.

the presence of HMTA catalyst in accordance with the above-described procedures and reaction conditions. The tris(3,5-di-t-butyl-4-hydroxybenzyl)isocyanurate obtained was comparable in all respects to those obtained by the procedure of Examples I–V.

The hydroxybenzyl-substituted isocyanurates obtained by the present process are useful stabilizers for a wide variety of organic materials. They are non-staining, possess low volatility and are extremely effective protective agents when incorporated in organic polymeric materials. They are effective for the protection of both natural and synthetic organic polymeric materials which are subject to oxidative, thermal and light-induced degradation. They are useful as stabilizers for α-olefin homopolymers and copolymers and particularly useful with polyethylene, polypropylene and ethylenepropylene copolymers and terpolymers.

To demonstrate the effectiveness as stabilizers in α-olefin polymers, 0.5 part tris(3,5-di-t-butyl-4-hydroxy-benzyl)isocyanurate obtained from the above Examples was dissolved in acetone and incorporated in 100 parts high-density

TABLE II

| Run | Solvent (grams) | Water (grams) | 2,6-DTBP (grkms) | Paraformaldehyde (grams) | CA (grams) | HMTA (grams) | Reaction temp. (° C.) | Reaction pressure (p.s.i.g.) | Melting point (° C.) | Percent yield |
| --- | --- | --- | --- | --- | --- | --- | --- | --- | --- | --- |
| 1 | Isopropanol (459) | 81 | 247 | 38.6 | 51.85 | 1.65 | 116 | 30.5 | 194–230 | 66 |
| 2 | do | 81 | 247 | 40.8 | 51.85 | 1.65 | 170 | 172 | 209–221 | 53.5 |
| 3 | n-Propanol (486) | 54 | 251 | 37.2 | 51.85 | 1.65 | 115 | 18 | 198–230 | 47.4 |

EXAMPLE V

Following the procedure of Example I, 378 grams Fotocol and 162 parts water were charged to a reactor containing 257 grams 2,6-DTBP, 41 grams paraformaldehyde, 52 grams CA and 1.65 grams HMTA. The reaction was heated to 115°C. An 89 percent yield of tris(3,5-di-t-butyl-4-hydroxybenzyl)isocyanurate having a melt point of 206-218° C. was obtained. When the molar amounts of 2,6-DTBP and paraformaldehyde were reduced to 2 mols per mol CA in the above run, bis(3,5-di-t-butyl-4-hydroxybenzyl)isocyanurate was obtained. The di-substituted product melted at about 250–260° C.

EXAMPLE VI

Tris(3,5-di-t-butyl-4-hydroxybenzyl)isocyanurate was prepared by the base catalysed reaction of the timethylol derivative of cyanuric acid with 2,6-DTBP in an aqueous alcohol reaction medium. The trimethylol precursor was formed by heating the CA in a formalin solution (37 percent formaldehyde). The amount of formalin solution employed was calculated that there was 3 mols formaldehyde available per mol CA. The resulting methylol derivative polyethylene by suspending the polyethylene in the acetone solution and then removing the solvent with a rotary evaporator. The stabilized polyethylene was hot milled at 290–300° F. for 5 minutes and molded into 10 mil sheets at 300° F. The stabilized sample was subjected to an oxygen atmosphere at 140° C. and found to have an induction period of about 35 hours as compared to an unstabilized high-density polyethylene sample whose induction period was only 0.5 hour. When bis-(3,5-di-t-butyl-4-hydroxybenzyl)hexyl isocyanurate was similarly incorporated in high-density polyethylene markedly increased stability was obtained. For example, a polyethylene sample stabilized with 0.1 part of the bis(3,5-di-t-butyl-4-hydroxybenzyl)hexyl isocyanurate had an induction period of about 52 hours. When 0.2 part β-dilauryldithiodipropionate was employed with the bis(3,5-di-t-butyl-4-hydroxybenzyl)hexyl isocyanurate the induction period was increased to 115 hours.

We claim:

1. A process for the preparation of hydroxybenzyl-substituted isocyanurates which comprises heating together at a temperature from about 70° C. to 180° C. in an alcohol reaction medium (1) a phenol or mixture of phenols having the formula

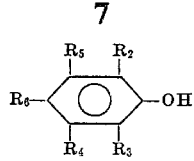

wherein $R_2$ is an alkyl group containing from 1 to 18 carbon atoms and $R_3$, $R_4$, $R_5$ and $R_6$ are hydrogen or alkyl groups containing from 1 to 18 carbon atoms, but at least one of the $R_3$, $R_4$, $R_5$ or $R_6$ groups is hydrogen; and (2) an organic heterocyclic compound selected from the group consisting of cyanuric acid and partial esters of cyanuric acid having the formula

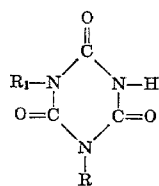

wherein R is an alkyl radical containing from 1 to 20 carbon atoms and $R_1$ is hydrogen or an alkyl radical containing from 1 to 20 carbon atoms and a formaldehyde-liberating compound wherein the alcohol reaction medium is an alcohol containing 1 to 6 carbon atoms and up to about 40 percent by weight water.

2. The process of claim 1 wherein the reaction is conducted in the presence of an organic or inorganic basic compound as a catalyst.

3. The process of claim 2 wherein (1) is a 2,6-dialkyl phenol wherein $R_2$ and $R_3$ are alkyl groups containing from 1 to 12 carbon atoms and $R_6$ is hydrogen.

4. The process of claim 3 wherein the organic or inorganic basic compound is selected from the group consisting of primary, secondary and tertiary monoamines, primary, secondary and tertiary polyamines, alkali metal alcoholates, alkali metal hydroxides and quaternary ammonium hydroxides.

5. The process of claim 4 wherein (1) is a 2,6-di-tertiary alkyl phenol wherein $R_2$ and $R_3$ are tertiary alkyl groups containing from 4 to 8 carbon atoms and $R_4$, $R_5$ and $R_6$ are hydrogen.

6. The process of claim 5 wherein the formaldehyde liberating compound is selected from the group consisting of formalin, paraformaldehyde and trioxane.

7. The process of claim 6 wherein the alcohol contains from 1 to 4 carbon atoms and the temperature of the reaction is from about 90 to 150° C.

8. The process of claim 7 wherein the organic heterocyclic compound is cyanuric acid, (1) is 2,6-di-t-butyl phenol, the formaldehyde-liberating compound is paraformaldehyde and the basic compound is a polyamine containing up to about 10 carbon atoms.

9. The process of claim 8 wherein the basic compound is hexamethylenetetraamine.

10. The process of claim 7 wherein the organic heterocyclic compound is a partial ester of cyanuric acid wherein R is an alkyl group containing from 6 to 18 carbon atoms, (1) is 2,6-di-t-butyl phenol, the formaldehyde-liberating compound is paraformaldehyde and the basic compound is a polyamine containing up to about 10 carbon atoms.

11. The process of claim 10 wherein the catalyst is hexamethylenetetraamine.

12. The process of claim 5 wherein the methylol derivative of cyanuric acid and 2,6-di-t-butyl phenol are employed.

13. The process of claim 12 wherein the basic compound is a polyamine containing up to about 10 carbon atoms.

14. The process of claim 5 wherein the methylol derivative of a partial ester of cyanuric acid wherein R is an alkyl radical containing from 6 to 18 carbon atoms and 2,6-di-t-butyl phenol are employed.

15. The process of claim 14 wherein the basic compound is a polyamine containing up to about 10 carbon atoms.

16. The process of claim 3 wherein (1) is 2,6-di-t-butyl phenol, the organic heterocyclic compound is cyanuric acid, the formaldehyde-liberating compound is paraformaldehyde and the basic compound is hexamethylenetetraamine.

17. The process of claim 3 wherein (1) is 2,6-di-t-butyl phenol, the organic heterocyclic compound is a partial ester of cyanuric acid wherein R is an alkyl radical containing from 6 to 18 carbon atoms, the formaldehyde-liberating compound is paraformaldehyde and the basic compound is hexamethylenetetraamine.

* * * * *